(12) United States Patent
Herlihy

(10) Patent No.: US 7,185,496 B2
(45) Date of Patent: Mar. 6, 2007

(54) SYNCHRONIZING STATIONARY CLUTCH OF COMPRESSION BRAKING WITH A TWO SPOOL GAS TURBINE ENGINE

(75) Inventor: Christopher J. Herlihy, Scottsdale, AZ (US)

(73) Assignee: Honeywell International, Inc., Morristown, NJ (US)

(*) Notice: Subject to any disclaimer, the term of this patent is extended or adjusted under 35 U.S.C. 154(b) by 349 days.

(21) Appl. No.: 10/889,672

(22) Filed: Jul. 12, 2004

(65) Prior Publication Data
US 2006/0005544 A1 Jan. 12, 2006

(51) Int. Cl.
F02C 3/113 (2006.01)
F02C 7/26 (2006.01)
F02C 7/36 (2006.01)

(52) U.S. Cl. .......................... 60/774; 60/778; 60/787; 60/39.163; 180/301; 74/DIG. 5

(58) Field of Classification Search ................. 60/774, 60/39.21, 778, 788, 39.163; 180/301; 74/DIG. 5
See application file for complete search history.

(56) References Cited

U.S. PATENT DOCUMENTS

| 3,488,947 | A | * | 1/1970 | Tischer et al. | 60/39.163 |
|---|---|---|---|---|---|
| 3,525,874 | A | * | 8/1970 | Toy | 290/14 |
| 3,699,351 | A | * | 10/1972 | Addie | 290/14 |
| 4,183,420 | A | * | 1/1980 | Kinoshita | 180/301 |
| 4,206,596 | A | | 6/1980 | Kuziak, Jr. et al. | |
| 4,642,029 | A | | 2/1987 | Cedoz | |
| 4,708,030 | A | | 11/1987 | Cordner | |
| 4,870,817 | A | | 10/1989 | Conn | |
| 5,418,400 | A | | 5/1995 | Stockton | |
| 5,577,973 | A | | 11/1996 | Schmidt | |
| 5,730,676 | A | | 3/1998 | Schmidt | |
| 5,762,156 | A | * | 6/1998 | Bates et al. | 180/301 |
| 6,409,622 | B1 | | 6/2002 | Bolz et al. | |
| 6,425,838 | B1 | | 7/2002 | Matsubara et al. | |
| 6,428,442 | B1 | | 8/2002 | Turgay et al. | |
| 6,558,289 | B2 | | 5/2003 | Chung | |
| 6,569,054 | B2 | | 5/2003 | Kato | |
| 6,582,333 | B2 | | 6/2003 | Man et al. | |
| 6,592,484 | B1 | | 7/2003 | Tsai et al. | |
| 6,595,884 | B1 | | 7/2003 | Ai et al. | |
| 6,599,214 | B2 | | 7/2003 | Swales | |

* cited by examiner

Primary Examiner—Ted Kim
(74) Attorney, Agent, or Firm—Ingrassia Fisher & Lorenz (57) ABSTRACT

A synchronizing stationary clutch system for compression braking in a two spool gas turbine engine is provided by the present invention. The synchronizing stationary clutch system allows the two shafts of a two spool gas turbine engine to be reliably coupled at any given speed of either shaft. This coupling ability is useful to a gas turbine engine functioning in a land vehicle for the purpose of slowing the forward momentum of a rolling vehicle. The clutch system may also allow the use of auxiliary power from an electrical motor to start the engine.

30 Claims, 4 Drawing Sheets

SYNCHRONIZING STATIONARY CLUTCH OF COMPRESSION BRAKING WITH A TWO SPOOL GAS TURBINE ENGINE

BACKGROUND OF THE INVENTION

The present invention relates generally to two spool gas turbine engines and more particularly to a two spool gas turbine engine having a synchronizing stationary clutch system used for energy dissipation, compression braking or starting of the gas turbine engine.

A two spool gas turbine engine has two independent, uncoupled main shafts, with the gas generation system on one shaft and independent power turbine on the second shaft. This mechanically uncoupled arrangement allows independent control of the power turbine speed and consequently more efficient operation of the power output of the engine, resulting in greater fuel economy. The engine is normally used to drive an engine gearbox mounted electric generator. The generator, in turn, charges batteries that power the land vehicle's drive sprocket mounted electric motors.

Once in motion, a conventional braking device can be used to slow or stop the land vehicle. However, if continuous or prolonged braking is required, such as when the vehicle is moving downhill, there is considerable heating and wear on the brake parts. In most diesel driven conventional transport semi trucks, braking is assisted by releasing the compressed air in the diesel engine's cylinders to the exhaust during the compression stroke. However, no such system for slowing a vehicle without conventional braking is used in two spool gas turbine engines.

The prior art discloses a number of systems for coupling two independent shafts in gas turbine engines. U.S. Pat. No. 4,642,029 discloses a braking system for stopping the rotation of counter rotating blade members of a gas turbine engine used in aircraft. The brake system comprises a clutch that allows simultaneous retardation of the rotation of two transfer shafts and, thereby, both rotating blade members. However, the brake system is designed to be used after the engine has been turned off and the blades need to stop rotating for noise and safety reasons. It does not disclose a system that allows for backdriving or slowing of an engine that is operating.

U.S. Pat. No. 5,577,973 discloses a transmission that provides for the differential of two or three separate and otherwise mechanically uncoupled prime movers in a hybrid arrangement. However, the coupling of the movers converts the constant speed of one of the prime movers into variable components of torque and speed as required for vehicle function but does not result in a braking or slowing of a vehicle.

As can be seen, there is a need for a system that allows backdriving or compression braking of a two spool gas turbine engine to control the speed a land vehicle while decreasing wear on the conventional braking system of the vehicle. Such a system may also be used to start the engine and/or retard an oversped turbine so as to eliminate the need for separate systems for those functions.

SUMMARY OF THE INVENTION

In one aspect of the present invention there is provided a synchronizing stationary clutch system comprising a power turbine shaft; a gas generator shaft; a generator/motor; the generator/motor being driven by the power turbine shaft; a planetary gear set, the planetary gear set engaging the power turbine shaft and the gas generator shaft; a carrier member coupled to the planetary gear set; a grounded stationary clutch, wherein when the grounded stationary clutch is engaged, it engages the carrier member; and wherein the grounded stationary clutch is adapted for coupling and uncoupling the power turbine shaft and the gas generator shaft, the power turbine shaft and the gas generator shaft are coupled when the grounded stationary clutch is engaged, and wherein the generator/motor is inverted from a generator mode to a motor mode when the power turbine shaft and the gas generator shaft are coupled via engagement of the grounded stationary clutch.

In another aspect of the invention there is provided a synchronizing stationary clutch system for a two spool gas turbine engine comprising a power turbine shaft; a first pinion gear, the first pinion gear being coupled to the turbine power shaft; an external-internal gear having an externally toothed gear and an internally toothed gear; a first gear, the first gear meshing with the externally toothed gear of the external-internal gear; a second gear, the second gear meshing with the first gear; a generator/motor, wherein the power turbine shaft drives the generator/motor; a gas generator shaft; a second pinion gear coupled to the gas generator shaft; a third gear, the third gear meshing with second pinion gear; a fourth gear, the fourth gear meshing with the third gear; a sun gear, the sun gear attached to the fourth gear; a carrier member, the carrier member containing a plurality of planet gear members, wherein the plurality of planetary members mesh with the sun gear and the internally toothed gear of the external-internal gear; a stationary clutch; and a clamp disc, wherein the grounded stationary clutch can engage the clamp disc; wherein the grounded stationary clutch is adapted for coupling and uncoupling the power turbine shaft and the gas generator shaft, the power turbine shaft and the gas generator shaft are coupled when the grounded stationary clutch is engaged, and wherein the generator/motor is inverted from a generator mode to a motor mode when the power turbine shaft and the gas generator shaft are coupled via engagement of the grounded stationary clutch.

In a further aspect of the invention there is provided a synchronizing stationary clutch system for a two spool gas turbine engine comprising a power turbine shaft for driving a generator/motor, wherein the power turbine shaft is connected to the generator/motor by a first series of gears, the power turbine shaft coupled to a first pinion gear, the first pinion gear configured for driving an externally toothed gear of an external-internal gear, the externally toothed gear of the external-internal gear configured for driving a first gear, and the first gear configured for driving a second gear, wherein the second gear is attached to the generator/motor; a gas generator shaft for driving a gas generator, the gas generator containing a compressor system, wherein the gas generator shaft is attached to the gas generator and the gas generator shaft is also coupled to a second pinion gear, the second pinion gear driving a third gear, the third gear driving a fourth gear, the fourth gear attached to the sun gear, wherein the sun gear then drives a plurality of planet gear members, the planet gear members contained in a carrier member; a grounded stationary clutch connected to a clamp disc; and wherein the grounded stationary clutch, when engaged, couples the power turbine shaft and the gas generator shaft, allowing the generator/motor to be inverted from a generator mode to a motor mode.

In yet another aspect of the present invention there is provided a two spool gas turbine engine comprising a synchronizing stationary clutch system, the synchronizing stationary clutch system comprising a power turbine shaft for driving a generator/motor, wherein the power turbine shaft is connected to the generator by a first series of gears, the power turbine shaft coupled to a first pinion gear, the first pinion gear driving an externally toothed gear of an external-internal gear, the externally toothed gear of the external-internal gear configured for driving a first gear, and the first gear configured for driving a second gear; a gas generator shaft for driving a gas generator system, the gas generator system comprising a compressor, wherein the gas generator shaft is coupled to a second pinion gear, the second pinion gear configured for driving a third gear, the third gear is configured for driving a fourth gear, the fourth gear attached to a sun gear, wherein the sun gear is configured to drive a plurality of planet gear members, the planet gear members contained in a carrier member; wherein the power turbine shaft and the gas generator shaft are uncoupled; a grounded stationary clutch connected to a clamp disc; and wherein the grounded stationary clutch, when engaged, couples the power turbine shaft and the gas generator shaft, allowing the generator/motor to be inverted from a generator mode to a motor mode.

In still another aspect of the present invention there is provided a method for energy dissipation in a gas turbine engine by releasing engine compressed air comprising the steps of engaging a clutch, the clutch then engaging a clamp disc; holding a carrier member in a non-rotating position by interaction with the clamp disc; coupling a power turbine shaft and a gas generating shaft through an external-internal gear, wherein the external-internal gear interacts with a plurality of planet gears contained in the carrier member and wherein the power turbine shaft is coupled to a first pinion gear, the first pinion gear meshing with an external toothed gear of the external-internal gear and wherein the gas generating shaft is coupled to a second pinion gear, the second pinion gear meshing with the plurality of planet gears contained in the carrier member through a series of gears; allowing a generator/motor to be inverted from generator mode to motor mode, wherein the gas turbine engine in backdriven; and releasing engine compressed air from a compressor of the gas turbine engine.

In yet a further aspect of the invention there is provided a method for compression braking of a land vehicle, the land vehicle comprising a two spool gas turbine engine, the method comprising the steps of engaging a grounded stationary clutch, wherein the engaged grounded stationary clutch then engages a clamp disc; holding a carrier member in a non-rotating position by interaction of the carrier member with the clamp disc; coupling a power turbine shaft and a gas generating shaft through a planetary gear set wherein the planetary gear set comprises an external-internal gear, wherein the external-internal gear interacts with a plurality of planet gears contained in the carrier member and wherein the power turbine shaft is coupled to a first pinion gear, the first pinion gear meshing with an external toothed gear of the external-internal gear and wherein the gas generating shaft is coupled to a second pinion gear, the second pinion gear meshing with a sun gear of the planetary gear set through a series of gears; inverting a generator/motor from generator mode to motor mode, wherein the gas turbine engine is backdriven; releasing engine compressed air from a compressor of a gas turbine engine; and whereby the land vehicle undergoes said compression braking.

In yet another aspect of the present invention there is provided a method for stabilizing a runaway engine wherein the engine is a two spool gas turbine engine, comprising the steps of engaging a grounded stationary clutch, wherein the engaged grounded stationary clutch then engages a clamp disc; holding a carrier member in a non-rotating position by interaction of the carrier member with the clamp disc; coupling a power turbine shaft and a gas generating shaft through a planetary gear set, wherein the planetary gear set comprises an internal gear of an external-internal gear and a sun gear, a plurality of planet gears contained in the carrier member wherein the plurality of planet gears interacts with the external-internal gear, and wherein the power turbine shaft is coupled to a first pinion gear, the first pinion gear meshing with an external toothed gear of the external-internal gear and wherein the gas generating shaft is coupled to a second pinion gear, the second pinion gear meshing with the sun gear through a series of gears; inverting a generator/motor from generator mode to motor mode, wherein the gas turbine engine is backdriven; releasing engine compressed air from a compressor of a gas turbine engine; and whereby the runaway engine is stabilized.

In still a further aspect of the present invention there is provided a method of starting a two spool gas turbine engine comprising the steps of engaging a grounded stationary clutch, wherein the grounded stationary clutch interacts with a carrier member; coupling a power turbine shaft and a gas generating shaft through a planetary gear set, wherein the planetary gear set comprises an internal gear of an external-internal gear and a sun gear, a plurality of planet gears contained in the carrier member wherein the plurality of planet gears interacts with the external-internal gear, and wherein the power turbine shaft is coupled to a first pinion gear, the first pinion gear meshing with an external toothed gear of the external-internal gear and wherein the gas generating shaft is coupled to a second pinion gear, the second pinion gear meshing with the sun gear through a series of gears; inverting a generator/motor from a generator mode to a motor mode; starting the gas turbine engine via the generator/motor; and releasing the grounded stationary clutch.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, a synchronizing stationary clutch system for compression braking in a two spool gas turbine engine is provided by the present invention. Conventional two spool gas turbine engines have a gas generator section and power turbines on separate mechanically uncoupled shafts. The synchronizing stationary clutch system of the present invention may allow the two shafts of the engine to be reliably coupled at any given speed of either shaft. Such coupling may allow compression braking of a gas turbine driven land vehicle whereby a moving vehicle may be slowed by dissipation of the energy propelling the vehicle. The synchronizing stationary clutch system of the instant invention may be used in a gas turbine driven land vehicles which require large amounts of electrical power generated from the output power of the engine.

There are a number of clutch systems for two spool engines described in the prior art. However, these systems are for conventional braking systems using friction plates and/or clamping systems to provide a braking force to the wheels or axles of a vehicle. Alternatively, other clutch systems are described for use in hybrid vehicles for converting the constant speed of the prime movers into variable components of torque and speed in order to effectively utilize input power for various sources. In contrast, the synchronizing stationary clutch of the present invention may allow for the coupling of a power turbine shaft and a gas generator shaft, resulting in the coupling of a generator/motor to the compressor of the engine. The generator/motor may be inverted from a generator mode to a motor mode, thereby directly backdriving the compressor. This "backdriving" of the engine may allow energy dissipation, which can help in slowing the forward motion of a land vehicle with the clutch system of the present invention.

Figure 1:
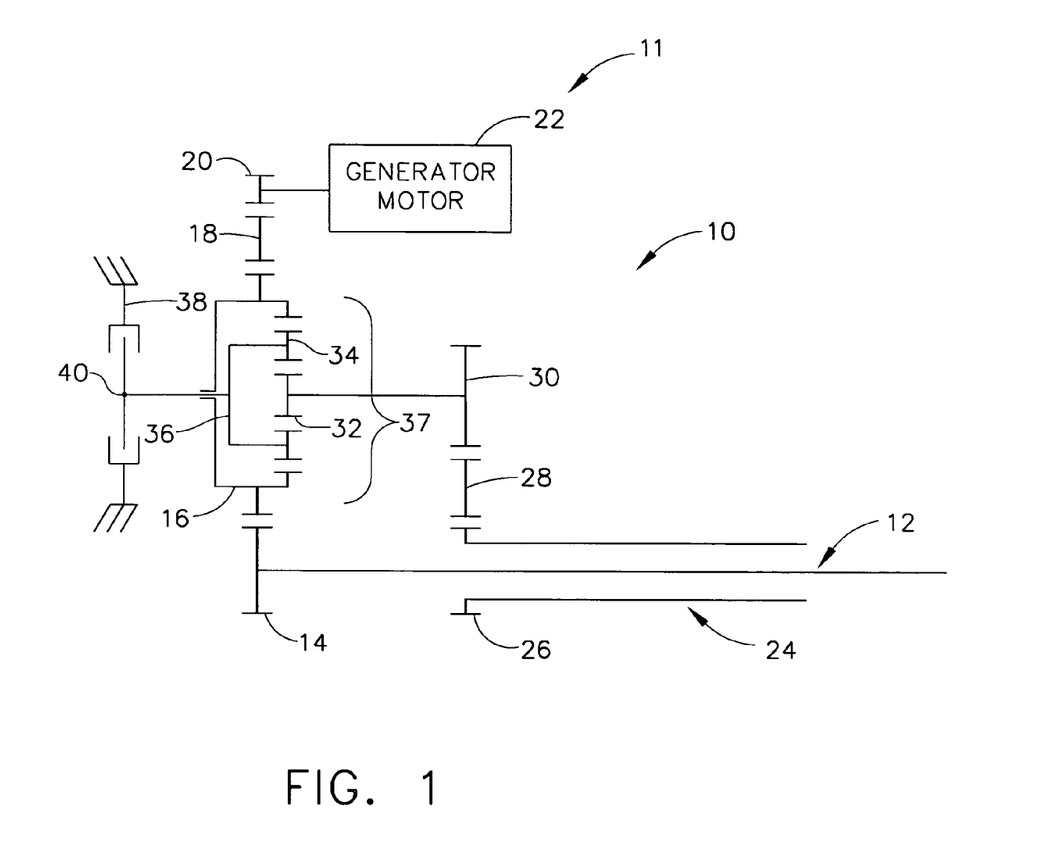
FIG. 1 is a schematic representation of a synchronizing stationary clutch system according to the present invention.
Figure 2:
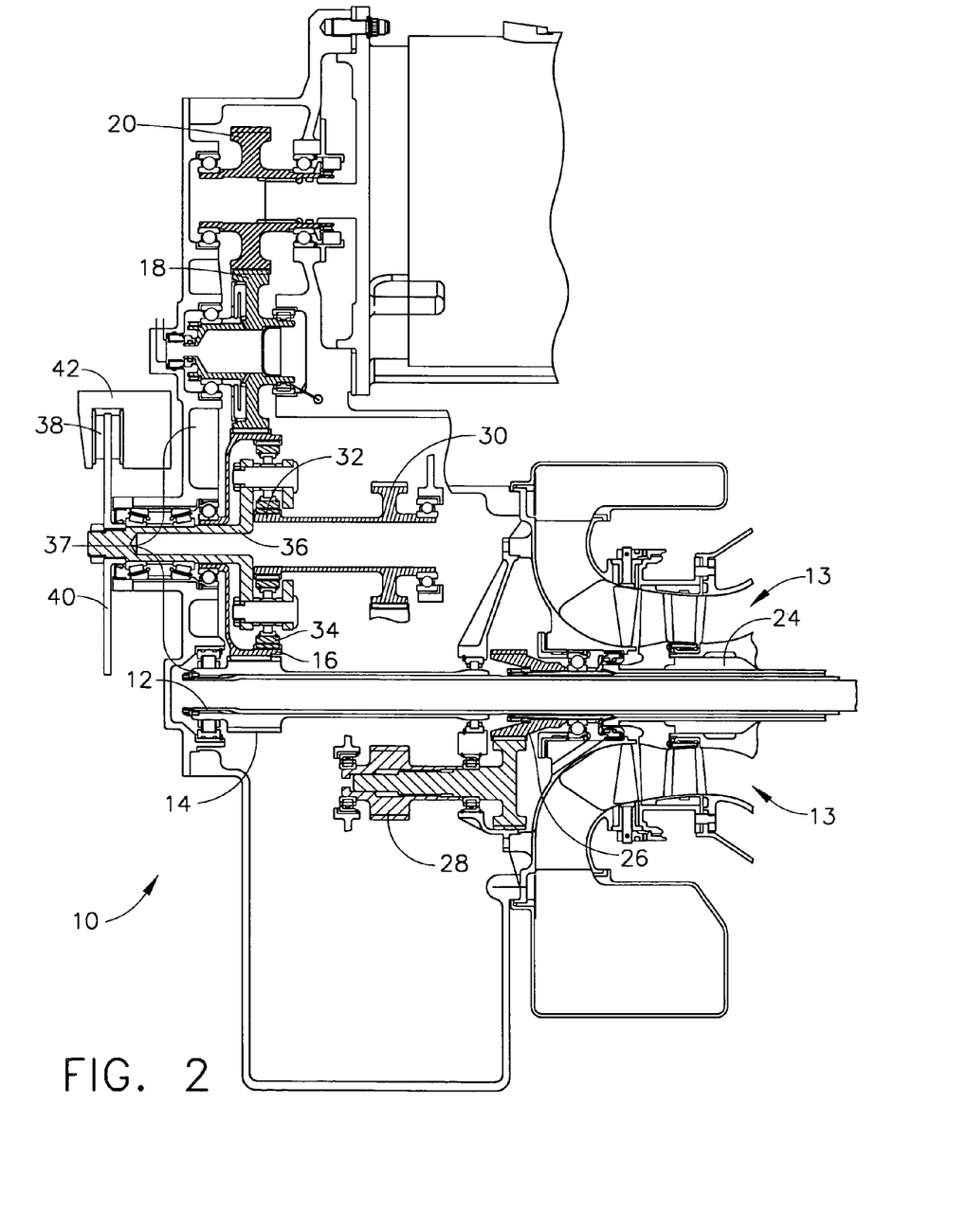
FIG. 2 is a cross-sectional view through a synchronizing stationary clutch system according to the present invention.
Figure 3:
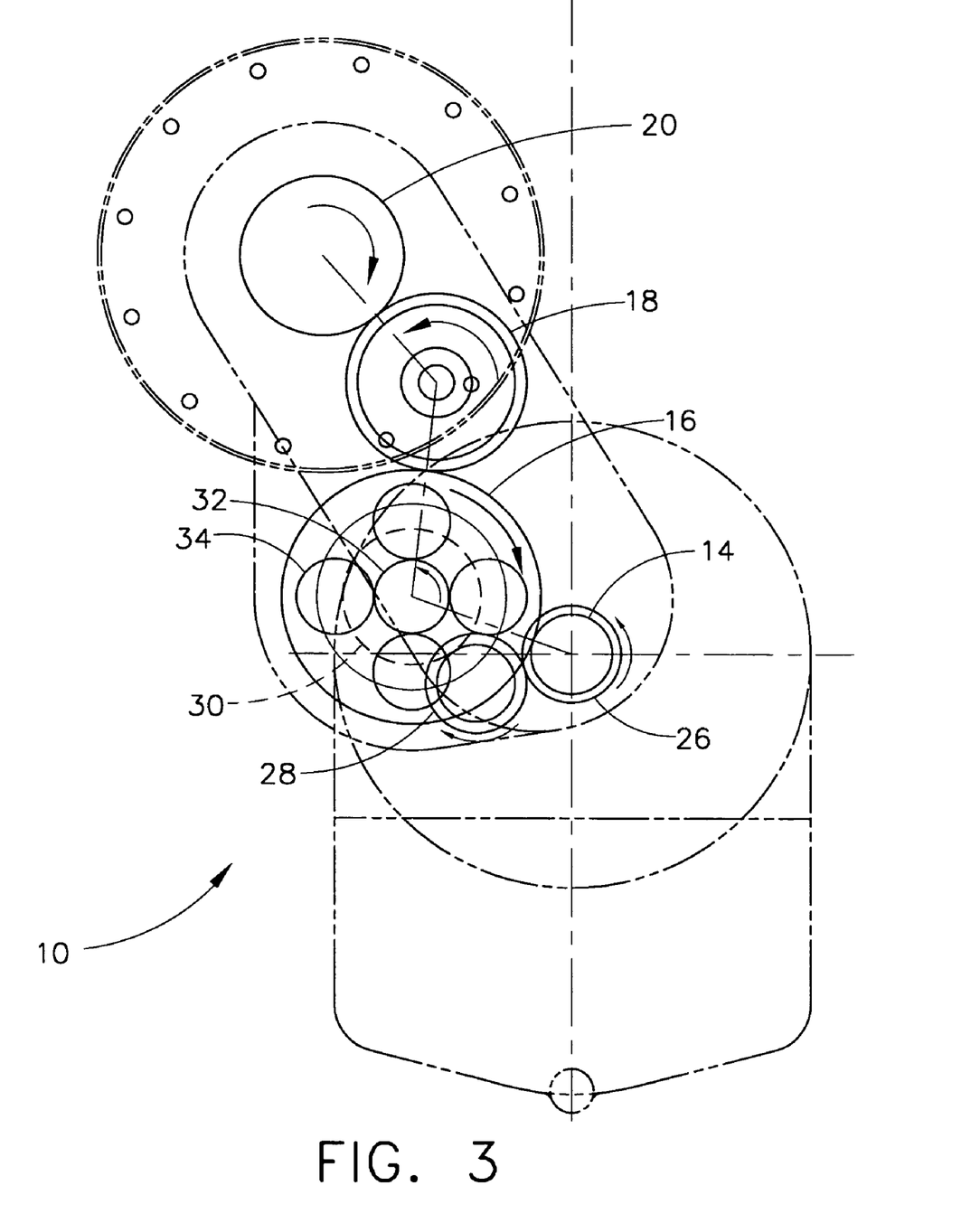
FIG. 3 is an end view of the synchronizing stationary clutch system of FIG. 2.

Referring to FIGS. 1 and 2, a synchronizing stationary clutch system 10 for a two spool gas turbine engine 11 may comprise a power turbine shaft 12 wherein the power turbine shaft 12 drives generator/motor 22 through a set of gears (see, for example, FIG. 3). The clutch system 10 of the present invention may further comprise a gas generator shaft 24 wherein the gas generator shaft ultimately drives a compressor 13 of the gas turbine engine 11. Under normal vehicle operating conditions, for example, when compression braking is not required, the power turbine shaft 12 and the gas generator shaft 24 are uncoupled. The clutch system may further comprise a clutch 38 which, when engaged, couples the power turbine shaft 12 to the gas generator shaft 24.

Power turbine shaft 12 may comprise a first pinion gear 14, wherein first pinion gear 14 is coupled to power turbine shaft 12. In an engine driving generator mode, the first pinion gear 14 may mesh with the externally toothed gear of external-internal gear 16. The externally toothed gear of external-internal gear 16 may mesh with first gear 18, which in turn may mesh with second gear 20 to drive generator/motor 22 at an appropriate speed. In a similar manner, gas generator shaft 24 may drive the compressor 13 of gas turbine engine 15. Gas generator shaft 24 may comprise a second pinion gear 26. Second pinion gear 26 may mesh with third gear 28, which in turn may mesh with fourth gear 30. Fourth gear 30 may be attached to sun gear 32, which in turn may mesh with a plurality of planet gear members 34. The plurality of planet gear members 34 may be contained in carrier member 36. During engine driving generator mode, carrier member 36 may spin or rotate at a speed determined by the speeds of the sun gear 32 and the internally toothed gear of the internal/external member 16.

The internal gear of external-internal gear 16, sun gear 32 and a plurality of planet gear members 34, held in carrier member 36, may make up a planetary gear set 37. FIG. 3 illustrates how the gears of the planetary gear set 37 may mesh together. Sun gear 32 may be positioned in the center of the planetary gear set 37. External-internal gear 16, which may also be referred to as the ring gear, has an internal toothed gear which may be an annular ring member of the planetary gear set 37. External-internal gear 16 may mesh with the plurality of planet gear members 34, which in turn may mesh with sun gear 32. The external toothed gear of external-internal gear 16 may mesh with first gear 18, which in turn may mesh with second gear 20 to drive generator motor 22. The internal toothed gear of external-internal gear 16 may mesh with the plurality of planet gear members 34, wherein the plurality of planet gear members 34 are also driven by gas generator shaft 24 through sun gear 32. During engine driving generator mode, however, the carrier 36 spins freely and no power is transmitted through the planetary gear set 37 whereby the power turbine shaft 12 and gas generator shaft 24 are uncoupled from each other.

Synchronizing stationary clutch system 10 may further comprise a grounded stationary clutch 38 and a clamp disc 40. In situations where the clutch may be useful, such as, but not limited to, energy dissipation, compression braking, starting the engine or stabilizing a runaway engine, grounded stationary clutch 38 may be engaged to couple power turbine shaft 12 to gas generator shaft 24. When engaged, grounded stationary clutch 38 may engage clamp disc 40. Clamp disc 40 may then engage carrier member 36, placing carrier member 36 in a non-rotating position. When carrier member 36 is in a non-rotating position, the plurality of planet gear members 34 may then engage the internal toothed gear of external-internal gear 16 and sun gear 32 thereby coupling power turbine shaft 12 to the gas generator shaft 24. Synchronizing stationary clutch system 10 may further comprise an actuator 42. Upon a command from an operator of the vehicle equipped with synchronizing stationary clutch system 10, or alternatively, an analog or digital computer generated controller command, actuator 42 may engage grounded stationary clutch 38. The sun gear 32 and external-internal gear 16 may be set to a chosen speed ratio such that carrier member 36 has a speed at or near zero before grounded stationary clutch 38 is engaged. Coupling of power turbine shaft 12 to gas generator shaft 24 may connect the generator/motor 22, which may be driven by the power turbine shaft 12, to the compressor, which may be driven by gas generator shaft 24. Coupling of the power turbine shaft 12 to the gas generator shaft 24 may allow the generator/motor 22 to be inverted from generator mode to motor mode. When in motor mode, generator/motor 22 may be the power source for the compressor, directly driving the compressor 13.

Synchronizing stationary clutch 10 may also be used to allow very short periods of coupling during emergency engine conditions, such as, but not limited to, a runaway engine, where the power turbine shaft 12 may be oversped. Under such conditions, power turbine shaft 12 may be coupled to gas generator shaft 24 via synchronizing stationary clutch 10, whereby the inertia of gas generator shaft 24 may be used to regain control of the power turbine shaft 12.

Figure 4:
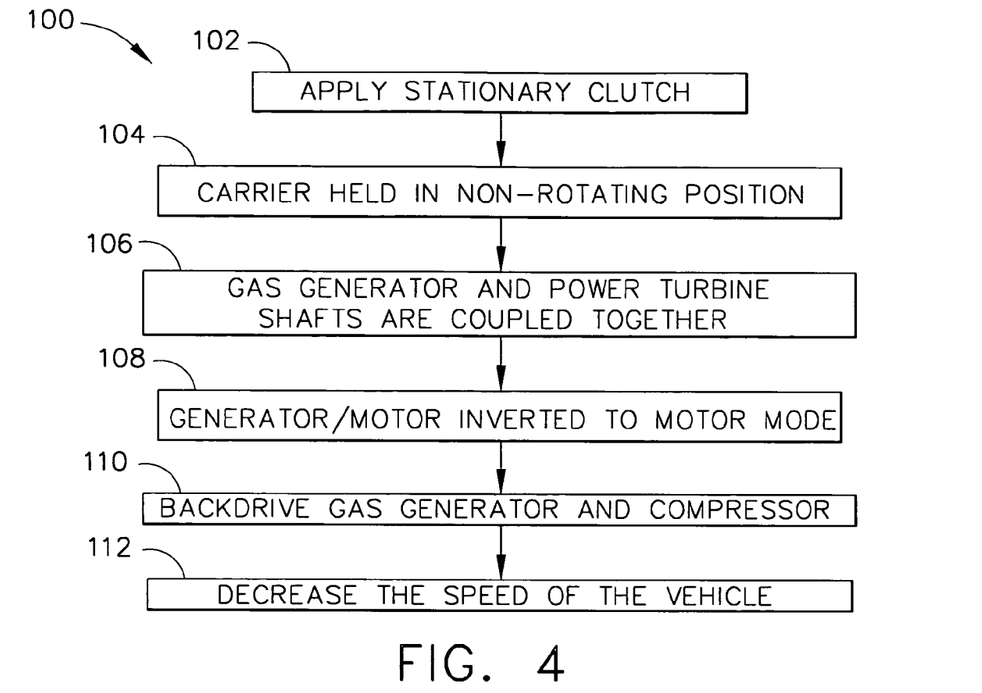
FIG. 4 is a flow chart of a method for compression braking with a two spool gas turbine engine of a land vehicle according to the present invention.

FIG. 4 illustrates a method 100 for compression braking of a land vehicle having a two spool gas turbine engine using the synchronizing stationary clutch system 10 of the instant invention. Step 102 may be to apply grounded stationary clutch 38 to clamp disc 40. This may be done on command from a control source such as a driver of the vehicle or a digital or analog computer controller, and the command may be communicated through actuator 42. In the next step 104, carrier member 36 may be held in a non-rotating position, resulting in step 106, the coupling of power turbine shaft 12 to gas generator shaft 24. In step 108 the generator/motor 22 may be inverted from generator mode to motor mode. The generator/motor 22 then may backdrive the gas generator shaft 24, and thus, the compressor 13, of the engine 11 in step 110. Backdriving the engine 11 may result in energy dissipation via compressor air bleed off, and may decrease the speed of the vehicle in step 112. While a vehicle is traveling forward or in reverse, it may be desirable to slow the vehicle down without excessive use of the brakes. For example, when traveling downhill, continuous or prolonged braking using the vehicle's conventional brakes may result in excessive wear on the brakes and a shorter lifespan. Using the synchronizing stationary clutch system 10 of the instant invention to decrease the speed of the vehicle may help to save such brake wear. Alternatively, method 100 may be used to decrease the speed of the engine during emergency engine conditions, such as, but not limited to, a runaway engine, where the power turbine shaft 12 may be oversped.

Figure 5:
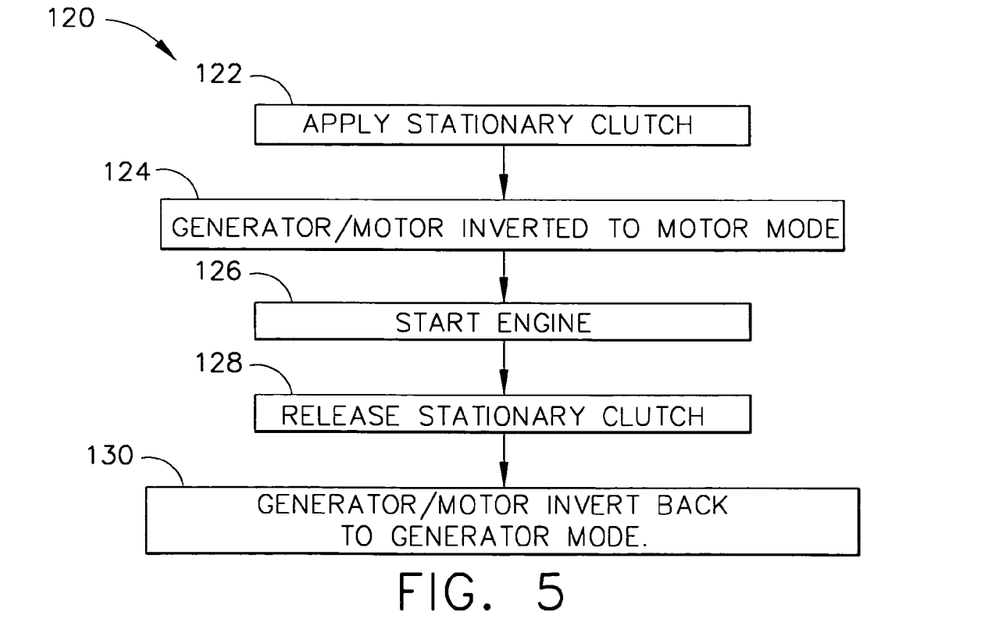
FIG. 5 is a flow chart of a method for starting a two spool gas turbine engine according to the present invention.

FIG. 5 is a flow chart illustrating a method 120 of starting a two spool gas turbine engine 11 using the synchronizing stationary clutch system 10 of the present invention. Engaging the synchronizing stationary clutch system 10 may provide auxiliary power to start the gas turbine engine 11. While the engine is off and there is zero speed to power turbine shaft 12 and gas generator shaft 24, grounded stationary clutch 38 may be applied or engaged in step 122. In the next step 124, generator/motor 22 may be inverted from generator mode to motor mode as a result of step 122. In step 126 the engine may be started by operation of the generator/motor 22 in motor mode. Once the engine is started, grounded stationary clutch 38 may be released or disengaged in step 128, thereby uncoupling power turbine shaft 12 from gas generator shaft 24. Upon uncoupling the power turbine shaft 12 from gas generator shaft 24, generator/motor 22 may be inverted back to generator mode in step 130.

It should be understood, of course, that the foregoing relates to exemplary embodiments of the invention and that modifications may be made without departing from the spirit and scope of the invention as set forth in the following claims.

I claim:

1. A synchronizing stationary clutch system comprising:
   a power turbine shaft;
   a gas generator shaft;
   a generator/motor, the generator/motor being driven by the power turbine shaft;
   a planetary gear set, the planetary gear set engaging the power turbine shaft and the gas generator shaft;
   a carrier member coupled to the planetary gear set;
   a grounded stationary clutch, wherein when the grounded stationary clutch is engaged it engages the carrier member; and
   wherein the grounded stationary clutch is adapted for coupling and uncoupling the power turbine shaft and the gas generator shaft, the power turbine shaft and the gas generator shaft are coupled when the grounded stationary clutch is engaged, and wherein the generator/motor is inverted from a generator mode to a motor mode when the power turbine shaft and the gas generator shaft are coupled via engagement of the grounded stationary clutch.

2. The synchronizing stationary clutch system of claim 1 wherein the planetary gear set comprises a sun gear, a plurality of planet gear members contained in the carrier member, and an external-internal gear, the external-internal gear comprising an internally toothed gear and an externally toothed gear, and wherein the internally toothed gear of the external-internal gear is an annular ring member of the planetary gear set.

3. The synchronizing stationary clutch system of claim 2 further comprising a first pinion gear coupled to the power turbine shaft, wherein the first pinion gear meshes with the externally toothed gear of the external-internal gear.

4. The synchronizing stationary clutch system of claim 3 further comprising a first gear and a second gear, wherein the first gear meshes with both the externally toothed gear of the external-internal gear and with the second gear.

5. The synchronizing stationary clutch system of claim 2 further comprising a second pinion gear coupled to the gas generator shaft.

6. The synchronizing stationary clutch system of claim 5 further comprising a third gear and a fourth gear, wherein the third gear meshes with both the second pinion gear and with the fourth gear, and wherein the fourth gear is attached to the sun gear.

7. The synchronizing stationary clutch system of claim 1 further comprising a clamp disc wherein, when the grounded stationary clutch engages the clamp disc, the clamp disc then engages the carrier member.

8. The synchronizing stationary clutch system of claim 1 further comprising an actuator, wherein the actuator relays commands from a control source to the grounded stationary clutch.

9. A synchronizing stationary clutch system for a two spool gas turbine engine comprising:
   a power turbine shaft;
   a first pinion gear, the first pinion gear being coupled to the turbine power shaft;
   an external-internal gear having an externally toothed gear and an internally toothed gear;
   a first gear, the first gear meshing with the externally toothed gear of the external-internal gear;
   a second gear, the second gear meshing with the first gear;
   a generator/motor, wherein the power turbine shaft drives the generator/motor;
   a gas generator shaft, wherein the gas generator shaft drives a compressor;
   a second pinion gear coupled to the gas generator shaft;
   a third gear, the third gear meshing with the second pinion gear;
   a fourth gear, the fourth gear meshing with the third gear;
   a sun gear, the sun gear attached to the fourth gear;
   a carrier member, the carrier member containing a plurality of planet gear members, wherein the plurality of planet gear members meshes with the sun gear and the internally toothed gear of the external-internal gear;
   a stationary clutch; and
   a clamp disc, wherein the grounded stationary clutch can engage the clamp disc;
   wherein the grounded stationary clutch is adapted for coupling and uncoupling the power turbine shaft and the gas generator shaft, the power turbine shaft and the gas generator shaft are coupled when the grounded stationary clutch is engaged, and wherein the generator/motor is inverted from a generator mode to a motor mode when the power turbine shaft and the gas generator shaft are coupled via engagement of the grounded stationary clutch.

10. The synchronizing stationary clutch system of claim 9 further comprising an actuator, wherein the actuator relays commands from a control source to the grounded stationary clutch.

11. The synchronizing stationary clutch system of claim 10 wherein the control source is a computer.

12. A synchronizing stationary clutch system for a two spool gas turbine engine comprising:
- a power turbine shaft for driving a generator/motor, wherein the power turbine shaft is connected to the generator/motor by a first series of gears, the power turbine shaft coupled to a first pinion gear, the first pinion gear configured for driving an externally toothed gear of an external-internal gear, the externally toothed gear of the external-internal gear configured for driving a first gear, and the first gear configured for driving a second gear, wherein the second gear is attached to the generator/motor;
- a gas generator shaft for driving a gas generator system, the gas generator system comprising a compressor, wherein the gas generator shaft is attached to the gas generator by a second series of gears, the gas generator shaft coupled to a second pinion gear, the second pinion gear driving a third gear, the third gear driving a fourth gear, the fourth gear attached to a sun gear, wherein the sun gear then drives a plurality of planet gear members, the planet gear members contained in a carrier member;
- wherein the power turbine shaft and the gas generator shaft are either coupled or uncoupled;
- a grounded stationary clutch connected to a clamp disc; and
- wherein the grounded stationary clutch, when engaged, couples the power turbine shaft and the gas generator shaft, allowing the generator/motor to be inverted from a generator mode to a motor mode.

13. A two spool gas turbine engine comprising a synchronizing stationary clutch system, the synchronizing stationary clutch system comprising:
- a power turbine shaft for driving a generator/motor, wherein the power turbine shaft is connected to the generator by a first series of gears, the power turbine shaft coupled to a first pinion gear, the first pinion gear driving an externally toothed gear of an external-internal gear, the externally toothed gear of the external-internal gear configured for driving a first gear, and the first gear configured for driving a second gear;
- a gas generator shaft for driving a gas generator system, the gas generator system comprising a compressor, wherein the gas generator shaft is attached to the gas generator by a second series of gears, the gas generator shaft coupled to a second pinion gear, the second pinion gear configured for driving a third gear, the third gear configured for driving a fourth gear, the fourth gear attached to a sun gear, wherein the sun gear is configured to drive a plurality of planet gear members, the planet gear members contained in a carrier member;
- wherein the power turbine shaft and the gas generator shaft are uncoupled;
- a grounded stationary clutch connected to a clamp disc; and
- wherein the grounded stationary clutch, when engaged, couples the power turbine shaft and the gas generator shaft, allowing the generator/motor to be inverted from a generator mode to a motor mode.

14. The two spool gas turbine engine of claim 13, wherein the gas turbine engine is an LV50-2 gas turbine engine.

15. The two spool gas turbine engine of claim 13, wherein the gas turbine engine is used to power a land vehicle.

16. The two spool gas turbine engine of claim 15 further comprising an actuator, wherein the actuator relays commands from a control source to the grounded stationary clutch.

17. The two spool gas turbine engine of claim 16 wherein the control source is a driver of the land vehicle.

18. The two spool gas turbine engine of claim 16 wherein the control source is a computer.

19. The two spool gas turbine engine of claim 13, wherein the synchronizing stationary clutch system provides energy dissipation from a compressor when the generator/motor is in motor mode.

20. The two spool gas turbine engine of claim 13, wherein the synchronizing stationary clutch system provides auxiliary power for starting the two spool gas turbine engine when the generator/motor is in motor mode.

21. A method for energy dissipation in a gas turbine engine by releasing engine compressed air comprising the steps of:
- engaging a grounded stationary clutch, the grounded stationary clutch then engaging a clamp disc;
- holding a carrier member in a non-rotating position by interaction with the clamp disc;
- coupling a power turbine shaft and a gas generating shaft through an external-internal gear, wherein the external-internal gear interacts with a plurality of planet gears contained in the carrier member and wherein the power turbine shaft is coupled to a first pinion gear, the first pinion gear meshing with an external toothed gear of the external-internal gear and wherein the gas generating shaft is coupled to a second pinion gear, the second pinion gear meshing with the plurality of planet gears through a series of gears;
- inverting a generator/motor generator mode to motor mode, wherein the gas turbine engine in backdriven; and
- releasing engine compressed air from a compressor of the gas turbine engine.

22. The method of claim 21 wherein the series of gears comprises a sun gear, and wherein the plurality of planet gear members meshes with both the external-internal gear and the sun gear.

23. The method of claim 22 wherein the sun gear and external-internal gear are set to a chosen speed ratio such that the carrier member has a speed at or near zero before the grounded stationary clutch is engaged.

24. The method of claim 21 further comprising the step of engaging an actuator to engage the grounded stationary clutch.

25. The method of claim 21 wherein the carrier member comprises planet gear members, the planet gear members meshing with the internal toothed gear of the external-internal gear and the sun gear member.

26. A method for compression braking of a land vehicle, the land vehicle comprising a two spool gas turbine engine, the method comprising the steps of:
- engaging a grounded stationary clutch, wherein the engaged grounded stationary clutch then engages a clamp disc;
- holding a carrier member in a non-rotating position by interaction of the carrier member with the clamp disc;
- coupling a power turbine shaft and a gas generating shaft through a planetary gear set, wherein the planetary gear set comprises an internal gear of an external-internal gear, and wherein the external-internal gear interacts with a plurality of planet gears contained in the carrier member, and wherein the power turbine shaft is coupled to a first pinion gear, the first pinion gear meshing with an external toothed gear of the external-internal gear, and wherein the gas generating shaft is coupled to a second pinion gear, the second pinion gear meshing with a sun gear of the planetary gear set through a series of gears;

inverting a generator/motor from generator mode to motor mode, wherein the gas turbine engine is backdriven; and releasing compressed air from a compressor of the gas turbine engine, whereby the land vehicle undergoes said compression braking.

27. A method for stabilizing a runaway engine wherein the engine is a two spool gas turbine engine comprising the steps of:

engaging a grounded stationary clutch, wherein the engaged grounded stationary clutch then engages a clamp disc;

holding a carrier member in a non-rotating position by interaction of the carrier member with the clamp disc;

coupling a power turbine shaft and a gas generating shaft through a planetary gear set, wherein the planetary set comprises an internal gear of an external-internal gear, a plurality of planet gears contained in the carrier member, wherein the plurality of planet gears interacts with the external-internal gear, and wherein the power turbine shaft is coupled to a first pinion gear, the first pinion gear meshing with an external toothed gear of the external-internal gear, and wherein the gas generating shaft is coupled to a second pinion gear, the second pinion gear meshing with a sun gear of the planetary gear set through a series of gears;

inverting a generator/motor from generator mode to motor mode, wherein the gas turbine engine is backdriven; and releasing compressed air from a compressor of the gas turbine engine, whereby the runaway engine is stabilized.

28. A method of starting a two spool gas turbine engine comprising the steps of:

engaging a grounded stationary clutch, wherein the grounded stationary clutch interacts with a carrier member;

coupling a power turbine shaft and a gas generating shaft through a planetary gear set, wherein the planetary set comprises an internal gear of an external-internal gear, a plurality of planter gears contained in the carrier member, wherein the plurality of planet gears interacts with the external-internal gear, and wherein the power turbine shaft is coupled to a first pinion gear, the first pinion gear meshing with an external toothed gear of the external-internal gear, and wherein the gas generating shaft is coupled to a second pinion gear, the second pinion gear meshing with a sun gear of the planetary gear set through a series of gears;

inverting a generator/motor from a generator mode to a motor mode;

starting the gas turbine engine via the generator/motor; and releasing the grounded stationary clutch.

29. The method of claim 28, wherein the two spool gas turbine engine is adapted for driving a land vehicle.

30. The method of claim 28 wherein the two spool gas turbine engine is an LV-50 engine.

* * * * *

UNITED STATES PATENT AND TRADEMARK OFFICE
CERTIFICATE OF CORRECTION

| | | |
|---|---|---|
| PATENT NO. | : 7,185,496 B2 | Page 1 of 1 |
| APPLICATION NO. | : 10/889672 | |
| DATED | : March 6, 2007 | |
| INVENTOR(S) | : Christopher J. Herlihy | |

It is certified that error appears in the above-identified patent and that said Letters Patent is hereby corrected as shown below:

Column 10, line 35, "in" should be changed to --is--.

Signed and Sealed this

Twelfth Day of June, 2007

JON W. DUDAS
*Director of the United States Patent and Trademark Office*